United States Patent [19]

White et al.

[11] Patent Number: 4,786,006

[45] Date of Patent: Nov. 22, 1988

[54] TRANSFER CARTRIDGE WITH LIGHT SEAL

[75] Inventors: Daniel P. White, Honeoye Falls; Michael A. Brookmire, Pittsford, both of N.Y.

[73] Assignee: Itek Graphix Corp., Waltham, Mass.

[21] Appl. No.: 920,193

[22] Filed: Oct. 17, 1986

[51] Int. Cl.$^4$ .................... B65H 18/08; G03B 17/26; B65D 85/38

[52] U.S. Cl. ............................ 242/67.3 R; 242/67.4; 242/71.1; 242/71.7; 354/275; 206/316; 206/409

[58] Field of Search ................. 242/55, 67.1 R, 67.2, 242/67.3 R, 67.4, 57, 55.53, 71.1, 71.7; 354/275; 352/78 R, 78 C, 72; 206/389, 393, 397, 409, 316

[56] References Cited

U.S. PATENT DOCUMENTS

| | | | |
|---|---|---|---|
| 3,974,974 | 8/1976 | Nishikawa | 242/75.4 X |
| 4,239,164 | 12/1980 | Barnsbee et al. | 242/71.1 X |
| 4,447,014 | 5/1984 | Azuma et al. | 242/68.4 X |

FOREIGN PATENT DOCUMENTS 2001606  2/1979  United Kingdom .

*Primary Examiner*—David Werner
*Attorney, Agent, or Firm*—Morgan & Finnegan

[57] ABSTRACT

A transfer cartridge for photosensitive material includes an enclosure with an entry slot in one of its walls, and end caps to seal the opposite ends of the enclosure. A pair of rollers is disposed in aligned, parallel relationship within the enclosure, and a flexible, opaque belt extends between the rollers, preferably in figure 8-fashion. One roller is rigidly mounted upon an elongated shaft, while the second roller is elastically mounted upon a second elongated shaft through the use of a torsion spring. Drive gears on the exterior of the cartridge impart rotational movement to the rollers and the nip between the rollers grasps the leading edge of a length of photosensitive material and introduces same into the belt. The continued rotation of the rollers in opposite directions causes the belt to wrap the photosensitive material several times about one roller in a sandwich-like fashion. The belt is chosen to be wider than the photosensitive material, and the length of the belt is chosen to be greater then the length of photosensitive material. Consequently, the belt serves as a complete light shield. The belt is formed from an opaque material that exhibits the ability to absorb infrared illumination. A reflective target is secured to one side of the belt, which is otherwise black, and an optical sensor is operatively associated with the target to define a home position for the belt.

23 Claims, 4 Drawing Sheets

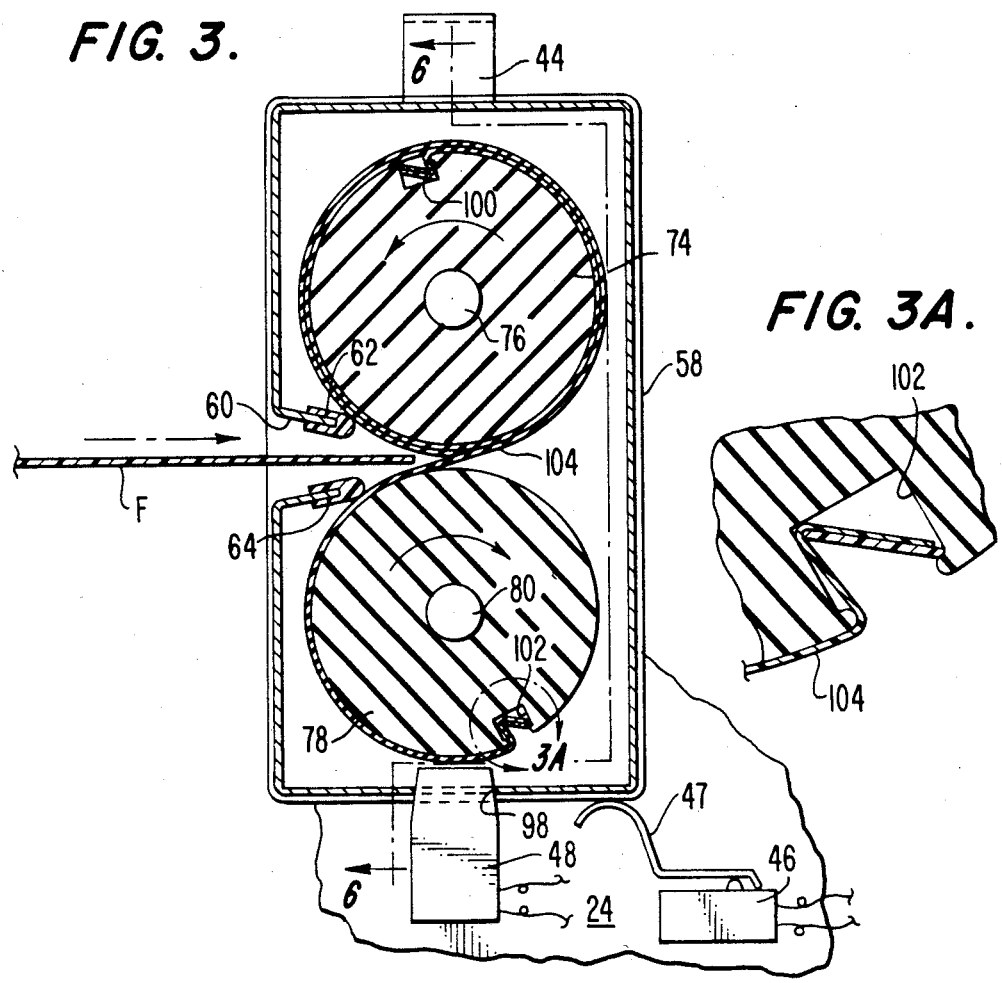
FIG. 3.
FIG. 3A.
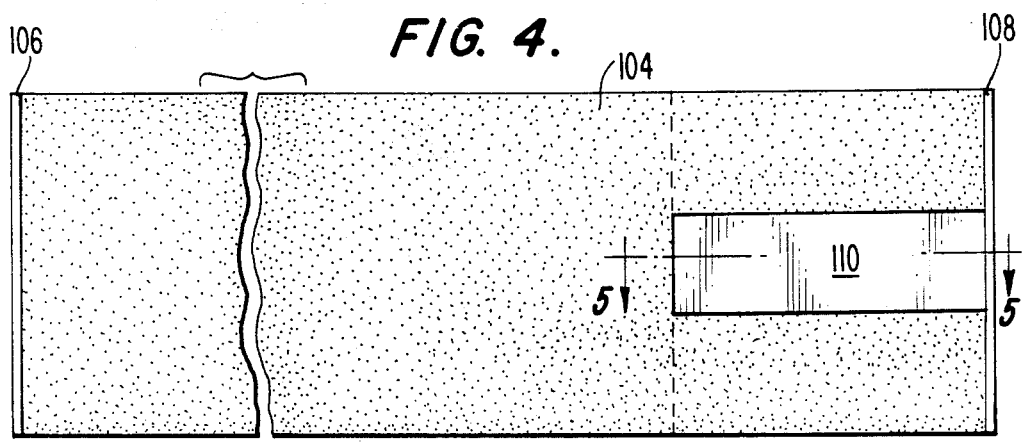
FIG. 4.
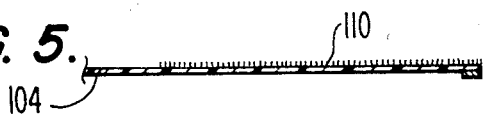
FIG. 5.

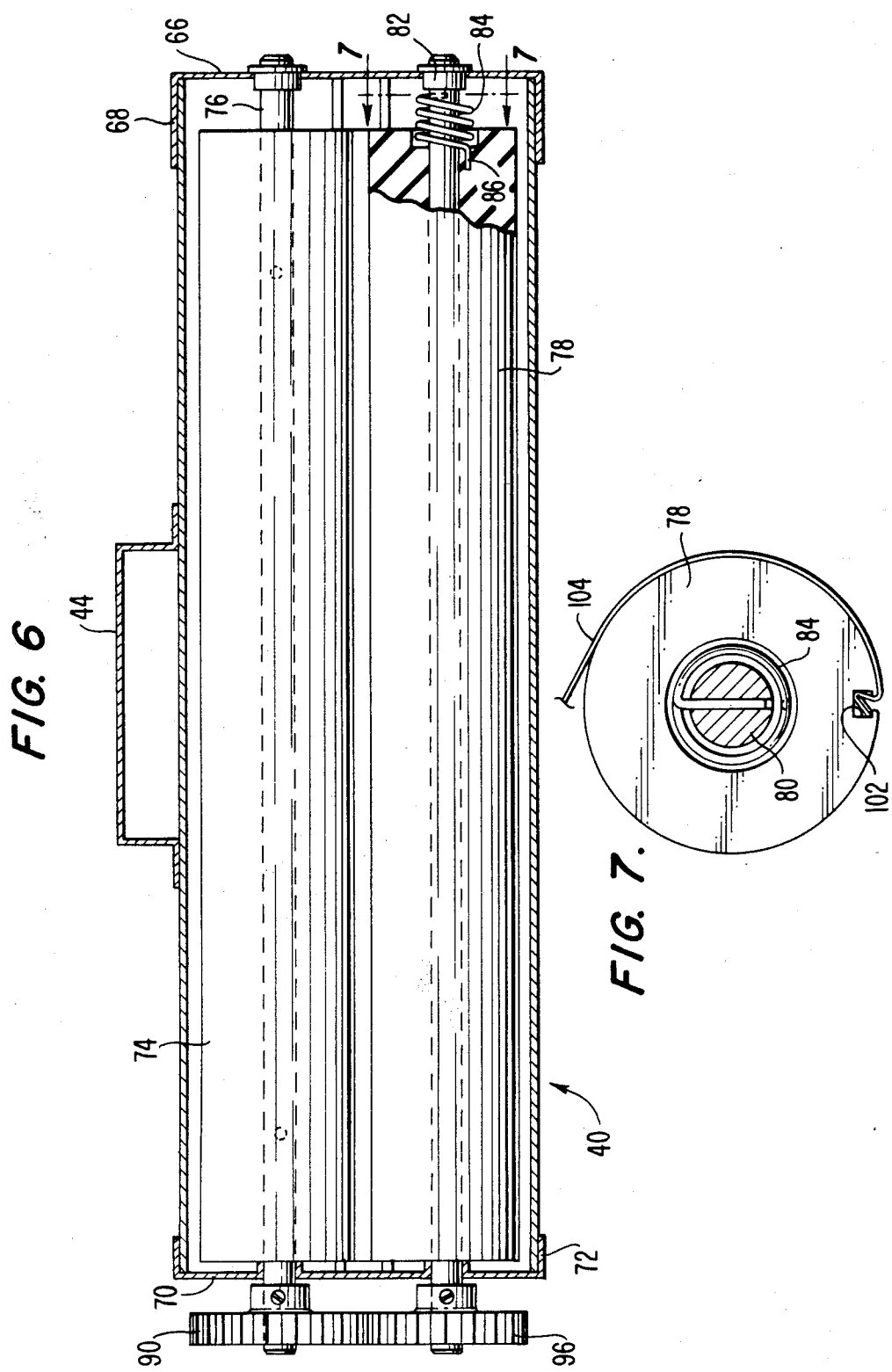

TRANSFER CARTRIDGE WITH LIGHT SEAL

BACKGROUND OF THE INVENTION

1. Field of the Invention

This invention relates generally to transfer cartridges for receiving and storing a pre-cut length of photosensitive material. More particularly, this invention pertains to a unique light seal for such cartridge, such light seal assuming the form of an opaque, flexible belt operatively associated with a pair of rollers.

2. Description of the Prior Art

Diverse light seals have been employed to keep light from penetrating the interior of transfer cartridges and exposing the photosensitive material received therein. Such light seals have relied upon mechanical light traps, light tight housings, and other known expedients.

One known light seal is disclosed in U.S. Pat. No. 3,743,200, granted July 3, 1973, to Michel Hommerin. This patent discloses a magazine for storing film sheets for use in X-ray film handling apparatus. The magazine includes a light-tight housing 1 and a slot 2 for introducing, or ejecting, the sheets F, and further includes a motor driven central storage roller 10. A plastic flexible band 7 is wound, respectively, around two cylindrical rollers 5, 6 which close off the slot. The film sheet F introduced into the slot is wound on the central roller and is stored between two faces of the band fed from the feed roller. For ejection the feed roller is driven in the opposite direction to unwind the band from the central roller and carry the sheet toward the slot. A first motor 11 and a belt 12 drive the central roller 10 in one direction, while a second motor 13 and a second belt 14 drive the roller 8, which carries the excess length of the band 7, in the opposite direction.

Whereas Hommerin may function satisfactorily under most operating conditions, certain deficiencies are noted For example, such magazine requires a light-tight housing, which entails increased costs in manufacturing same. Such magazine relies upon cylindrical rollers 4, 5 to seal the slot in a light-tight manner; the surface of roller 4 has a supple surface. However, while the nip defined between the rollers may be satisfactory for handling X-ray film, the nip may well destroy, or at least mar, the emulsion, found on photosensitive film. Also, the positioning of guides 17 and the drive rollers 8, 9 within the housing reduces the capacity of photosensitive material that can be received, and stored, therein.

Another X-ray film cassette, or cartridge, that receives, or dispenses, sheets of X-ray film in a light-tight manner is shown in U.S. Pat. No. 3,715,087, granted Feb. 18, 1971, to Gunter Schmidt. Here again, a light tight housing 40 is utilized in connection with a slidable solenoid operated light shield 130 (FIG. 2) to prevent exposure of the X-ray film within removable storage module 18. The film is wound on an opaque web 84 that is wound about drum 60, as shown in FIG. 1.

SUMMARY OF THE INVENTION

The present invention provides a simple yet effective, transfer cartridge for photosensitive material that is light-tight, and yet does not require a light-tight housing and/or closely spaced rollers adjacent to the entry slot leading into the housing to achieve this desirable result. Applicants have relied upon an opaque, flexible belt to receive, transport, and store photosensitive film in a light-free manner within the confines of a transfer cartridge.

The unique transfer cartridge employs a pair of spaced rollers that extend across the full width of the cartridge, and the opposing ends of the opaque belt are secured in grooves in the rollers, preferably to define a figure-8 configuration for the belt. Drive gears are connected to shafts projecting exteriorly of the metal housing, so that the full width of the housing is available to store photosensitive material. A torsion spring is operatively with one roller to insure proper tensioning of the belt, while the other roller is rigidly mounted upon its elongated shaft. The remotely mounted gears are easily engaged with the drive train of the photographic apparatus, such as a daylight camera, within which the transfer cartridge is utilized.

The rollers are housed within a unitary enclosure that receives end caps at the opposite ends of the enclosure. The end caps overlap the edges of the rollers and provide reliable light shielding.

The opaque flexible belt receives, transports, and stores, cut lengths of photosensitive material without scratching, or otherwise marring, the sensitive emulsion on the material. The belt extends the full width of the cartridge, is flexible, and conforms to the photosensitive material and the rollers, and effectively protects the entire width of the photosensitive material. The belt is formed of an opaque, plastic-coated fabric.

The pair of rollers within the transfer cartridge, and the opaque belt wound thereabout, are driven at the same speed. Consequently, slippage is eliminated between the various components and scratching of the emulsion of the photographic emulsion is obviated.

An aperture is defined in the housing for the transfer cartridge, and an infrared detector, or other optical sensor, directs a beam of light therethrough to impinge upon the flexible, opaque belt, which is black on both sides, except for a small reflective target on its outer side. The beam is usually absorbed by the black belt; the target reflects the beam back to the detector. Consequently, when the detector recognizes the transition from the target to the black belt, or vice versa, the central computer unit for the camera system realizes that the belt has been properly wrapped about the rollers and is in condition to receive, or disgorge, a cut length of photosensitive material. The central computer unit controls the drive rollers for the system accordingly.

The configuration of the transfer cartridge, and its ease of operation, eliminates the need for forming a leader on the photosensitive material being introduced into the cartridge. Thus, more exposures can be realized from a roll of photosensitive material utilized in a supply cartridge for the photographic apparatus.

Numerous other advantages realized by the present transfer cartridge will become readily available to the skilled artisan from the ensuing description when construed in harmony with the appended drawings.

BRIEF DESCRIPTION OF THE DRAWINGS

FIG. 3 is a vertical cross-sectional view of the transfer cartridge of FIGS. 2 and 3, such view showing a length of photosensitive material entering the transfer cartridge, and an opaque belt wrapped about a pair of rollers;

FIG. 3A is a fragmentary, detailed view, on an enlarged scale of the manner in which the belt is joined to a roller;

FIG. 4 is a fragmentary plan view of the flexible, opaque belt employed within the transfer cartridge of FIGS. 2 and 3;

FIG. 5 is a cross-sectional view of a fragment of the opaque belt, such view being taken along line 5—5 in FIG. 4 and in the direction indicated;

FIG. 6 is a vertical cross-sectional view of the transfer cartridge, such view being taken along line 6—6 in FIG. 3 and in the direction indicated; a fragment of the lower roller is removed for the sake of clarity; and FIG. 7 is an end elevational view of the lower roller of FIG. 6 showing a torsion spring operatively associated therewith, such view being taken along line 7—7 in FIG. 6 and in the direction indicated.

DESCRIPTION OF THE PREFERRED EMBODIMENT

Figure 1:
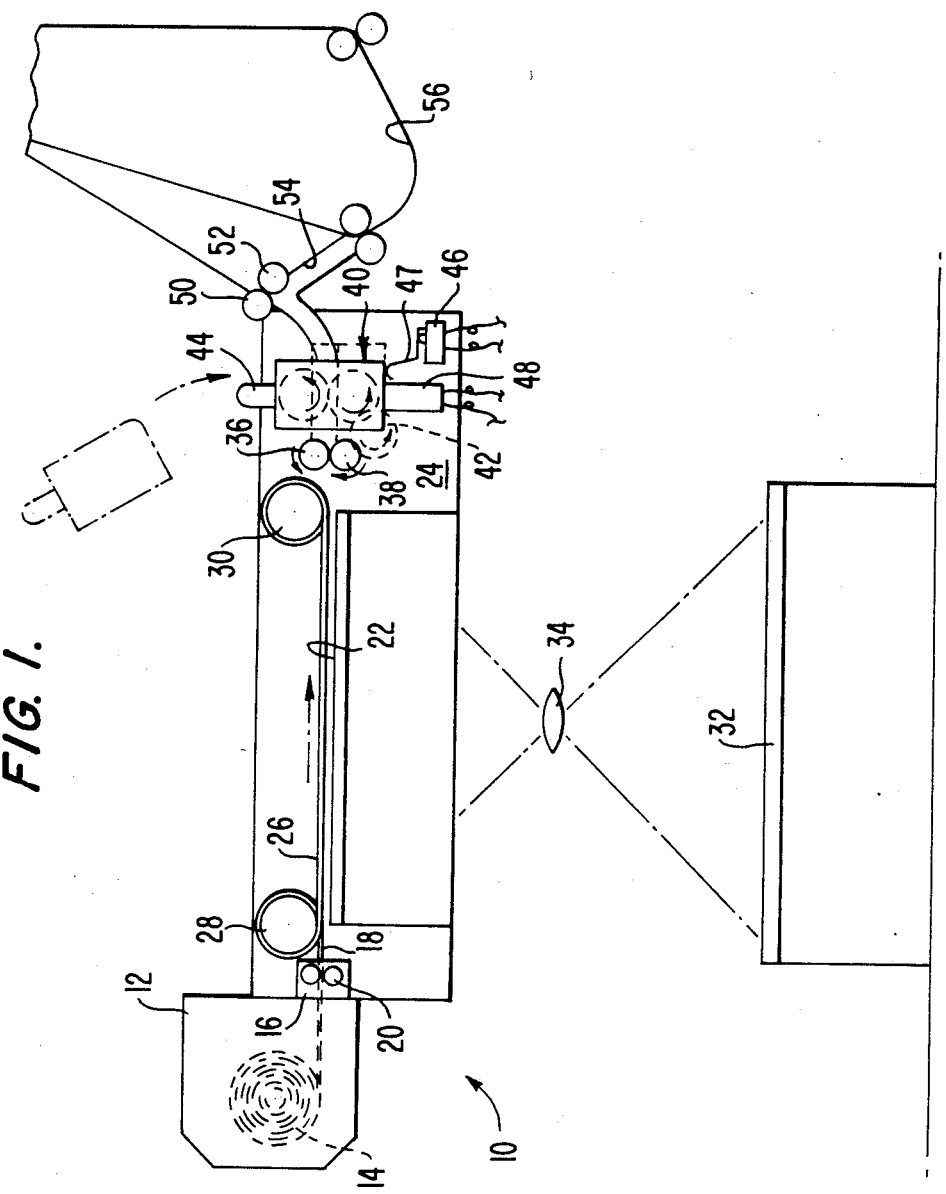
FIG. 1 is a schematic representation of a conventional, vertically oriented photographic apparatus, with a removable transfer cartridge shown in phantom outline prior to insertion into the apparatus.
Figure 2:
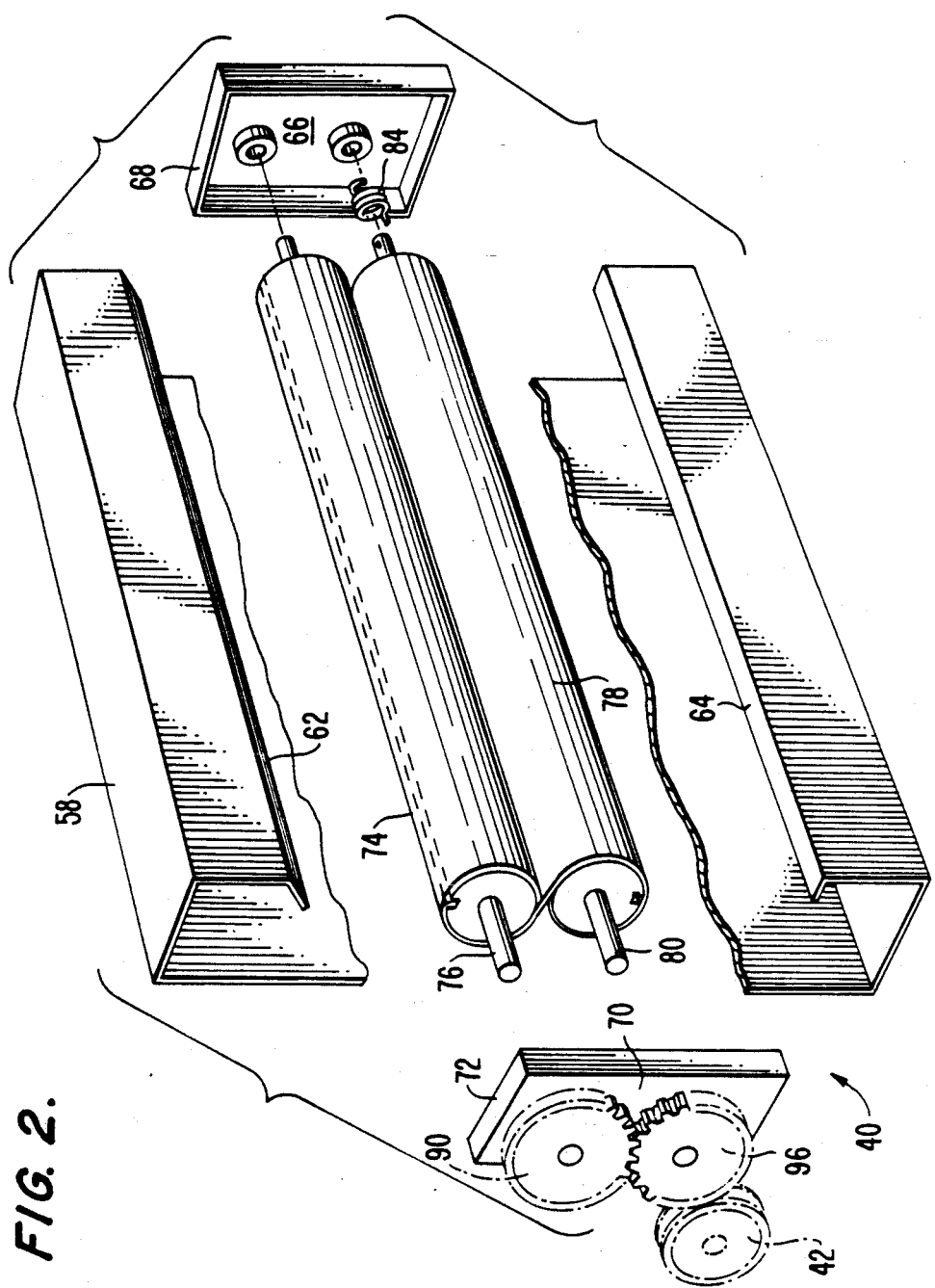
FIG. 2 is an exploded perspective view of a transfer cartridge constructed in accordance with the principles of the present invention.

Turning now to the drawings, FIG. 1 presents a schematic representation of a conventional daylight, graphic arts camera system 10. Such system includes a D-shaped box 12 which contains a roll of photosensitive material 14; a buffer box 16 with a pair of rollers 18 and 20 is secured to the box. The rollers, when driven from a power source (not shown) withdraw a length of photosensitive material and advance same toward the platen 22 of the camera 24.

A transport belt 26 extends between rollers 28 and 30 situated at opposite ends of the platen 22. After a desired length of photosensitive material has been withdrawn from box 12, either automatically or manually, a cutter (not shown) severs the photosensitive material. The belt 26 then advances the cut length of photosensitive material across the platen until the material is properly centered on the glass platen 22 and a vacuum holddown mechanism (not shown) presses the photosensitive material against the platen. The camera 24 is then operated, so that the photosensitive material 14 receives, through lens 34, an exposure of the graphic materials arranged on illuminated surface 32. Lens 34 of camera 24 can be adjusted vertically relative to surface 32 in a conventional fashion.

After being exposed, the cut length of photosensitive material is advanced by the transport belt 26 toward the nip of rollers 36, 38 which are situated downstream of platen 22. Rollers 36, 38 advance the photosensitive material into the transfer cartridge 40. A compound gear 42 is operatively associated with rollers 36 and 38.

Transfer cartridge 40 has a handle 44 at its upper end, for when the cut length of photosensitive material is wound up within the interior of the cartridge, the cartridge may be removed from the camera system and the contents may be processed at a remote location. One instance when it is desirable, if not mandatory, to remove the cartridge occurs when a special imager, such as plate material and negative film, is received within the cartridge. This special imager requires developing operations incompatible with normal operation of the processor section of the daylight camera system 10.

A microswitch 46 is tripped by curved blade 47 when the cartridge is inserted into the camera 24. An infrared sensor 48 is situated on the camera and is operatively associated with the transfer cartridge 40.

If the transfer cartridge 40 is not present within the camera system, a cut length of photosensitive material is advanced by rollers 50, 52 through appropriate guides 54 into the processor section 56 of the camera system. The exposed photosensitive material is developed in processor section 56 in a known manner. Representative daylight, graphic arts cameras of the type described generally above are available from several sources, including Itek Graphix Corp. of Waltham, Mass. and Visual Graphics Corp. of Tamarac, Fla.

FIGS. 2-7 reveal the details of the unique transfer cartridge 40 that is constructed in accordance with the principles of this invention. Cartridge 40 comprises a unitary metal enclosure 58 that is unbroken on three sides and forms an entrance slot 60 in its front panel. The height of the slot is defined by spaced, inwardly projecting flanges 62 and 64. A first end cap 66 with an inturned lip 68 that extends about is perimeter is slipped over one end of the enclosure 58, while a second end cap 70 with an inturned lip 72 is slipped over the other end of the enclosure 58. The width of the slot 60 is defined by the distance between inturned lip 68 on cap 66 and inturned lip 72 on cap 70.

An upper roller 74 is mounted upon an elongated shaft 76. The roller 74 extends laterally across the enclosure, and terminates a short distance from each end cap. The opposing ends of the shaft 76 extend through apertures and bushings in the end caps 66 and 70, and support the roller 74. A lower roller 78, which may be identical to roller 74, is similarly mounted upon an elongated shaft 80. The roller 78 extends laterally across the enclosure, and terminates a short distance inboard of each end cap. The opposing ends of the shaft 80 extend through apertures and bushings in the end caps 66 and 70, and support roller 78. Rollers 74 and 78 are parallel to each other, and aligned with each other, as shown in FIG. 3. The lips on the end caps 66, 70 may overlap the rollers by 0.30 inches on each side of the rollers, as suggested at the left-hand side of FIG. 6.

End 82 of spring 87 is joined to shaft 80 in proximity to end cap 66, and the other end 86 of torsion spring 84 is secured to the roller 78, as shown in FIGS. 6 and 7. When the end caps 66, 70 are secured to the enclosure 58, one end of shaft 76 projects through aperture 88 in the bushing in the end cap 66, and the other end of shaft 76 projects through a similar aperture in the bushing in the end cap 70. A gear 90 is secured to the shaft 76 to impart motion to roller 74.

When the end caps 66, 70 are secured to the enclosures 58, one end of shaft 80. projects through aperture 92 in the bushing in end cap 66, and the other end of shaft 80 projects through a similar aperture in end cap 70. A gear 96 is secured to the shaft 80 to impart motion to roller 78. Gears 90, 96 mesh with each other, and when power is supplied to one of the gears from compound gear 42, both rollers are driven. The torsion spring 84 forms an elastic coupling between roller 78 and shaft 80.

An aperture 98 is formed in the lower surface of enclosure 58, as shown in FIG. 3, to permit coaction between sensor 48 and the belt wrapped about the rollers 74, 78 positioned within the enclosure. A groove 100 is formed in roller 74, and extends laterally across its entire width. A similar groove 102 is formed in roller 78, and extends laterally across its entire width.

One end of an opaque rubber belt 104 is seated within groove 100 in roller 74, while the opposite end of the belt is seated within groove 102 in roller 78. The belt is wound clockwise several times about roller 74, and then is wound counterclockwise partially about roller 78, before being secured thereto. Belt 104 is flexible and conforms to the surfaces of the rollers 74, 78 about which it is wound, and torsion spring 84 maintains the belt taut at all times, regardless of the number of times the belt is wrapped about either roller. The length of the belt is chosen to be greater than the length of the cut lengths of photosensitive material fed into the transfer cartridge. Also, as suggested in FIG. 4, belt 104 is wider than the width of the widest sheet of photosensitive material that is used within the camera system, so that margins 106, 108 of belt 104 appear at the opposite lateral edges of the belt. In actual operating conditions, the margins must be at least a half an inch in width.

A white, reflective target 110, or strip, is secured to one side of the belt, which is otherwise black, as shown in FIGS. 4 and 5. When infrared sensor 48 shines through aperture 98 in the enclosure, the infrared beam will usually be absorbed by the belt; however, when target 110 passes into the path of the beam from sensor 48, the beam will be reflected back to the sensor 48. A signal will be sent by the sensor to a central computer unit (not shown) within the camera system that will respond to the transition from black to white (or absorbing or reflecting) and alter a signal to the drive motor (not shown) which drives gears 90, 96. The transition from black to white, or white to black, on the area of the belt being sensed insures that the belt is wrapped around the roller to receive the cut length of photographic material at least once. This relationship insures that the photosensitive material will not engage a bare roller at an time. This relationship holds true regardless of the direction of belt drive, for it is the transition from black (absorbing) to white (reflecting), or vice versa, that produces the indication that the belt has been wound properly.

CYCLE OF OPERATION

The above-described transfer cartridge 40, which is characterized by, inter alia, a simplified light seal relying upon an opaque rubber belt 104 secured about rollers 74, 78, functions in the following manner with regard to graphic arts camera system 10.

A box 12 of photosensitive material is placed in a receptacle at one side of the system, as shown in FIG. 1. Cartridge 40 is inserted into the system so that switch 46 on camera 24 is tripped. A length of material is withdrawn from box 12 by power driven rollers 18, 20. After withdrawal, the material is cut, centered on the platen, exposed and processed in the usual manner.

The exposed length of material is advanced by transport belt 26 into the nip of rollers 36, 38, and such rollers, in turn, advance the length of photosensitive material F into the entrance slot 60 in cartridge 40, as shown in FIG. 4.

Compound gear 42 is driven along with rollers 36, 38 and transmits power to gear 96 located on the exterior of cartridge 40 and adjacent to end cap 70. Gear 96 meshes with gear 90, and the gears are driven in synchronism but in opposite directions Since gears 96 and 90 are secured to shafts 80 and 76, respectively, rollers 74 and 78 are also driven at the same speed but in opposite directions. FIG. 3, for example, shows that roller 74 rotates counterclockwise, while roller 78 rotates clockwise; the length of photosensitive material F is advanced through the entrance slot 60 until the leading edge of the photosensitive material is picked up by the nip between the rollers 74 and 78.

As the rollers continue to rotate in opposite directions, the length of photosensitive material is wrapped up in belt 104 as the belt wraps about roller 74. Since the belt 104 is flexible, and conforms to the curvature of the rollers, the length of photosensitive material is wound up in a light-tight, sandwich. Since belt 104 is opaque, is wider than the photosensitive material, and is longer than the length of photosensitive material, the photosensitive material is effectively shielded from ambient light. The end caps 66 70 cooperate with enclosure 58 to further enhance the light-tight characteristic of the cartridge 40, and also define the width of the entrance slot.

The belt stops its winding operation after the trailing edge of the length of photosensitive material F has entered the cartridge and advanced past the nip between rollers 74 and 78. When the target 110 appears in the field of operation for infrared sensor 48, the infrared beam is reflected by the belt back to sensor 48. The sensor then supplies an appropriate signal to the central circuitry (not shown) for the camera system, which governs the operation of the several small motors (not shown) that operate the various drive gears in the proper relationship. The target 110 cooperates with sensor 48 to insure that the belt is either wound, or unwound, to its home position.

After the belt 104 has been wound up, the transfer cartridge is picked up by handle 44 and removed to an alternative processor designed to handle special imaging materials, such as those used in platemaking operations. When the transfer cartridge is placed in the alternative processor (not shown), the drive gears 90, 96 are driven in the opposite direction and rollers 74, 78 unwrap the belt 104, which is anchored, preferably, in a figure-8 configuration The rollers and belt disgorge the length of photosensitive material F through the slot 60 in the front wall of enclosure 58. Flanges 62, 64 assist in straightening out the length of photosensitive material F, if the material has curled while being wrapped about one, or the other, roller.

The above-described transfer cartridge 40 successfully achieves a light seal without complicated light trapping devices previously utilized, and without requiring undue attention to the sealing of the enclosure 58 by the end caps 66 and 70. Furthermore, the opaque, plastic-coated fabric belt 104 that is anchored to rollers 74, 78, preferably in a figure 8-fashion, facilitates the manner in which a strip of photosensitive material F enters the cartridge. The meshing gears 90, 96 and torsion spring 84 wrapped about shaft 80 insure that the rollers will move at the same speed and that the soft emulsion face of the photosensitive material will not be scratched. The reflective target 110 on the belt 104 cooperates with infrared sensor 48 to detect the transition from an absorbing (non-reflecting) surface to a white target (reflecting) surface to insure that a proper length of belt 104 is wound, or unwound, before receiving a cut length of photosensitive material The meshing gears 90, 96 can be positively driven to wrap up the length of photosensitive material in a sandwich with belt 104, and may be positively driven in the reverse direction to expel the length of photosensitive material through slot 60 in the front face of enclosure 58. There is always an adequate wrap of the belt to insure that the photosensitive material never directly contacts a metal roller. The belt is black on both sides, except for target 110, and the belt is long enough, and wide enough, to completely conceal any photosensitive material entrained therein in a light tight manner The belt is flexible enough, since it may be made of an opaque, plastic-covered fabric, to conform to the surfaces of the rollers 74 and 78. The belt may be executed entirely in plastic, if so desired While the preferred embodiment of the invention has been described in detail, numerous changes may occur to the skilled artisan For example, rollers 74 and 78 need not be of the same diameter, but may be of different size. The rollers could be polygonal in end elevation, and may only be approximately round The rollers and driving gears therefor need not be equal in size Belt 104 may be formed of any flexible material, such as plastic, or rubber, or combinations thereof, that is opaque and can conform to the curvature of the rollers The cut length of photosensitive material may be manually advanced, rather than utilizing a transport belt. The target on belt 104 need not be infrared reflective, but may exhibit any appropriate optical characteristics that may be optically sensed by sensor 48. The belt may be secured to the rollers by diverse techniques. While the transfer cartridge has been described in relation to a daylight, graphic arts camera, the light seal may find application in X-ray machines and in conventional cameras relying upon dark-room development techniques. Consequently, the appended claims should not be limited to their exact terms, but should be liberally construed in a manner commensurate with the significant advances in the useful arts and sciences achieved by the present invention.

We claim:

1. A transfer cartridge for receiving and storing a length of photosensitive material therein comprising:
    an elongated enclosure closed at both ends and on all sides except for an entry slot defined in one side thereof said entry slot being substantially free from light sealing means;
    a first roller rotatably supported within said enclosure in proximity to said entry slot and substantially parallel to said entry slot;
    a second roller rotatably supported within said enclosure substantially parallel to said first roller, a space being provided between said rollers adjacent to said entry slot;
    a flexible opaque belt attached at one end thereof to said first roller and attached at the other end thereof to said second roller, said flexible opaque belt being wrapped at least partially around said first roller in a first direction, said flexible belt traversing said space between said first and second rollers and being wrapped around said second roller in a second direction opposite to said first direction;
    drive means connected to at least one of said rollers for rotating said rollers as a length of photosensitive material enters said enclosure through said entry slot and engages said flexible belt so that the length of photosensitive material is wrapped, in sandwich-like light-tight fashion, around one of said rollers between layers of said flexible belt.

2. The transfer cartridge according to claim 1 wherein said first and second rollers are substantially the same size and are both driven by said drive means at substantially the same speed.

3. The transfer cartridge according to claim 1 wherein said drive means subsequently drives said rollers in the reverse direction to unwrap the photosensitive material from said flexible belt.

4. The transfer cartridge according to claim 3 wherein said entry slot is defined by a pair of spaced inwardly projected flanges, said flanges tending to straighten out any curvature in lengths of photosensitive material introduced into or withdrawn from said enclosure.

5. The transfer cartridge according to claim 1 further comprising torsion spring means mounted on one of said rollers for maintaining said flexible belt taut between said rollers.

6. The transfer cartridge according to claim 5 wherein said flexible opaque belt has a width that is wider than the widest photosensitive material to be stored.

7. The transfer cartridge according to claim 6 wherein said opaque flexible belt projects at least one-half inch beyond each side of the widest photosensitive material to be stored in the transfer cartridge.

8. The transfer cartridge according to claim 1 further comprising sensor means for determining whether said belt and rollers are in the appropriate start position for receiving photosensitive material and, if not, directing said drive means to drive said rollers and said belt to said start position.

9. A transfer cartridge according to claim 1 wherein said belt is black in color and is capable of absorbing infrared radiation.

10. A transfer cartridge according to claim 9 wherein an optical target is defined on one surface of said belt, such target being capable of reflecting illumination striking same.

11. A transfer cartridge according to claim 10 wherein an aperture is formed through said enclosure and a sensor is positioned in proximity to said aperture so that radiation from said sensor impinges upon said belt.

12. The transfer cartridge according to claim 11 wherein said sensor transmits infrared radiation and detects infrared radiation reflected from said target.

13. A transfer cartridge according to claim 1 wherein a first groove extends laterally across said second roller, one end of said opaque belt being secured within said first groove, and the other end of said opaque belt being secured within said second groove.

14. In a photographic apparatus wherein a length of photosensitive material is withdrawn from a supply cartridge, cut, positioned at an exposure station, exposed and advanced, the improvement comprising a transfer cartridge for receiving and storing said length of photosensitive material, said transfer cartridge comprising:
    an elongated enclosure closed at both ends and on all sides except for an entry slot defined in one side thereof, said entry slot being substantially free from light sealing means;
    a first elongated shaft rotatably supported within said enclosure having a first roller mounted thereon, said first roller being substantially parallel to said entry slot;
    a second elongated shaft rotatably supported within said enclosure having a second roller mounted thereon, said second roller being substantially parallel to and spaced apart from said first roller such that said space between said first and second rollers is adjacent to said entry slot;

a flexible opaque belt attached at one end thereof to said first roller and attached at the other end thereof to said second roller, said flexible opaque belt being wrapped at least partially around said first roller in a first direction, said belt traversing said space between said first and second rollers and being wrapped at least partially around said second roller in a second direction opposite to said first direction, said opaque belt having a width greater than the width of the widest sheet of photosensitive material to be stored;

drive means connected to at least one of said elongated shafts for rotating said rollers as a length of photosensitive material enters said enclosure through said entry slot and engages said flexible belt so that the length of photosensitive material is wrapped, in sandwich-like light-tight fashion, around one of said rollers between layers of said flexible belt.

15. The transfer cartridge according to claim 14 wherein said drive means is connected to both of said elongated shafts.

16. The transfer cartridge according to claim 15 wherein said rollers are substantially the same size and are rotated at substantially the same speed in opposite directions by said drive means and said elongated shafts.

17. The transfer cartridge according to claim 15 wherein said first roller is fixedly mounted to said first elongated shaft and said second roller is elastically rotatably mounted to said second elongated shaft.

18. The transfer cartridge according to claim 17 further comprising a torsion spring mounted between said second roller and said second elongated shaft to elastically mount said second roll on said second elongated shaft to bias said second roller against said flexible belt nd keep said flexible belt taut.

19. The transfer cartridge according to claim 18 wherein said drive means subsequently drives said rollers in the opposite direction to unwrap the length of photosensitive material from said flexible belt.

20. The transfer cartridge according to claim 19 wherein said entry slot is defined by a pair of spaced inwardly projecting flanges, said flanges tending to straighten out any curvature in lengths of photosensitive material introduced into or withdrawn from said enclosure.

21. The transfer cartridge according to claim 14 further comprising sensor means for determining whether said belt and rollers are in a start position for receiving a length of photosensitive material and, if not, directing said drive means to drive said rollers and said belt to said start position.

22. A method of storing a length of photosensitive material comprising:
(i) providing a photosensitive material transfer cartridge having
an entry slot substantially free from light sealing means;
a first roller supported within said enclosure in proximity to said entry slot and substantially parallel to said entry slot;
a second roller supported within said enclosure substantially parallel to said first roller;
a flexible opaque belt attached at one end thereof to said first roller and attached at the other end thereof to said second roller, said flexible opaque belt being wrapped at least partially around said first roller in a first direction; said belt traversing said space between said first and second rollers and being wrapped at least partially around said second roller in a second direction opposite to said first direction, said opaque belt having a width greater than the width of the widest sheet of photosensitive material to be stored in the transfer cartridge; and
drive means for simultaneously driving said rollers in opposite directions, said drive means driving said rollers in a forward direction wherein said belt is unwrapped from said first roller and wrapped onto said second roller, said drive means driving said rollers in a reverse direction wherein said belt is unwrapped from said second roller and wrapped onto said first roller;
(ii) inserting a length of photosensitive material through said entry slot between said first second rollers to engage said flexible belt;
(iii) activating said drive means to rotate said rollers in said forward direction to wrap the length of photosensitive material in sandwich-like light-tight fashion around said first roller between layers of said flexible belt.

23. The method according to claim 22 further comprising the step of:
subsequently activating said drive means to rotate said rollers in the reverse direction to unwrap the length of photosensitive material from said flexible belt.

* * * * *

UNITED STATES PATENT AND TRADEMARK OFFICE
CERTIFICATE OF CORRECTION

PATENT NO. : 4,786,006
DATED : November 22, 1988
INVENTOR(S) : Daniel P. White and Michael A. Brookmire It is certified that error appears in the above-identified patent and that said Letters Patent is hereby corrected as shown below:

Column 1, line 39, after "noted" insert --.--

Column 1, line 46, after "emulsion" delete --,--

Column 2, line 11, after "tively" insert --associated--

Column 6, line 14, after "66" insert --,--

Column 6, line 62, after "material" insert --.--

Column 7, line 5, after "manner" insert --.--

Column 7, line 9, after "desired" insert --.--

Column 7, line 12, after "artisan" insert --.--

Column 7, line 15, after "round" insert --.--

Column 7, line 16, after "size" insert --.--

Column 7, line 19, after "rollers" insert --.--

Column 7, line 40, after "thereof" insert --,--

Column 8, line 15, "claim 5" should read --claim 1--

Column 8, line 46, after "said" insert --first roller and a second groove extends laterally across said--

Column 9, line 38, "nd" should read --and--

UNITED STATES PATENT AND TRADEMARK OFFICE
CERTIFICATE OF CORRECTION

PATENT NO. : 4,786,006

DATED : November 22, 1988

INVENTOR(S) : Daniel P. White and Michael A. Brookmire

It is certified that error appears in the above-identified patent and that said Letters Patent is hereby corrected as shown below:

Column 10, line 37, after "first" inser --and--.

Signed and Sealed this

Twenty-eighth Day of March, 1989

Attest:

DONALD J. QUIGG

Attesting Officer

Commissioner of Patents and Trademarks